Dec. 8, 1942.

H. WALLER ET AL 2,304,132

MANAGEMENT INSTRUMENT

Filed Sept. 13, 1941

INVENTORS
HERBERT WALLER
ALFRED F. SCHLOMANN
BY Walter S. Bleston
ATTORNEY

INVENTORS
HERBERT WALLER
ALFRED F. SCHLOMANN
BY Walter S. Bleston
ATTORNEY

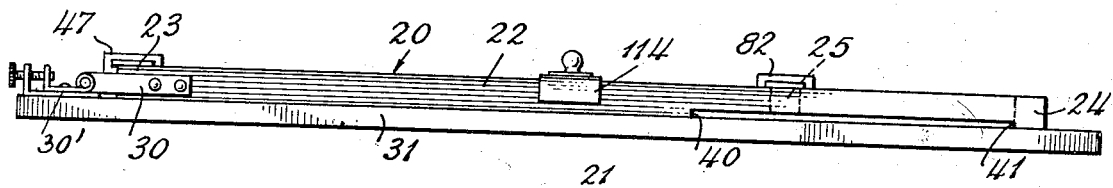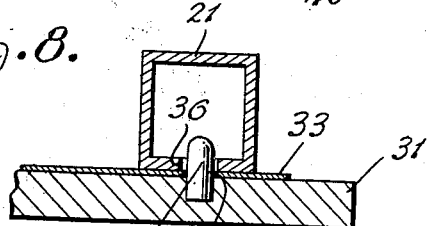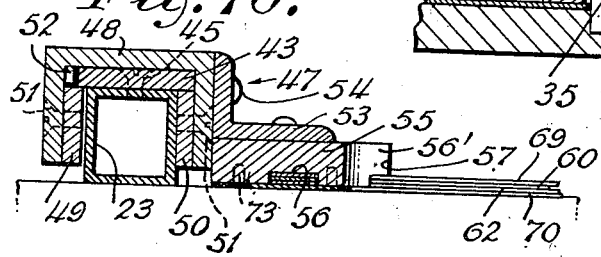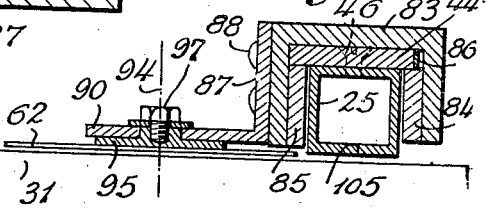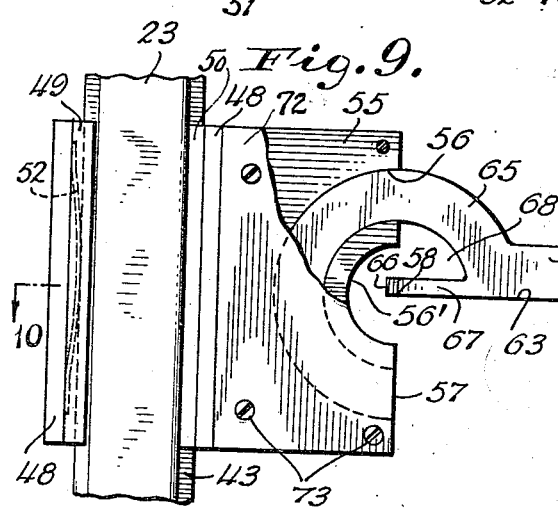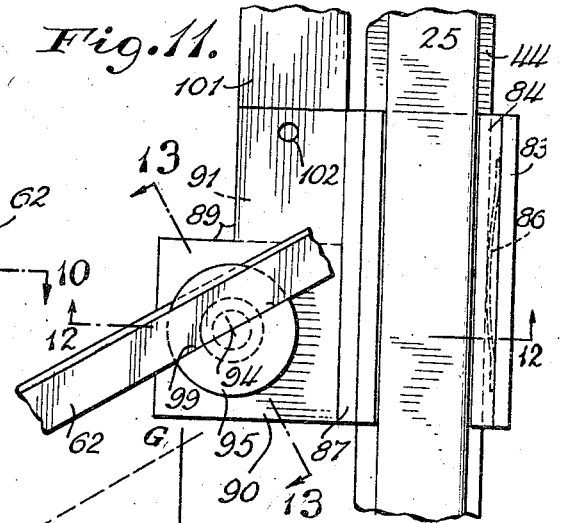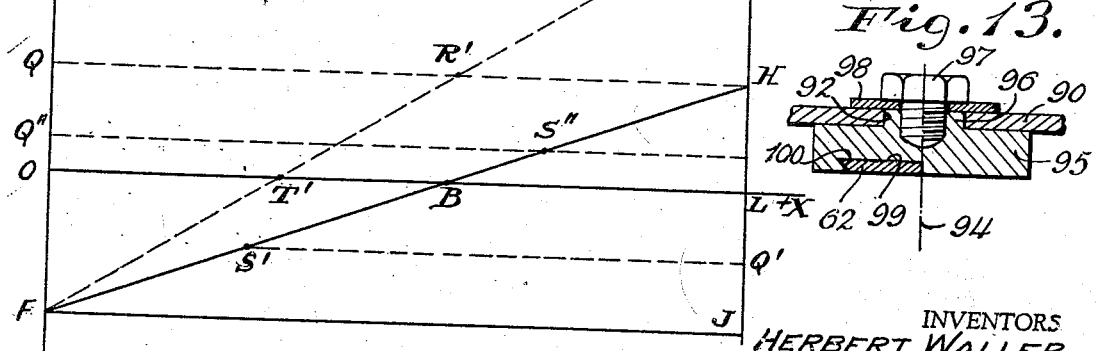

Patented Dec. 8, 1942

2,304,132

UNITED STATES PATENT OFFICE 2,304,132

MANAGEMENT INSTRUMENT

Herbert Waller and Alfred F. Schlomann,
New York, N. Y.

Application September 13, 1941, Serial No. 410,698

20 Claims. (Cl. 33—97)

The present invention relates to an instrument for use in the analysis and in the management of business enterprises. The object of the invention is the provision of an instrument whereby certain data essential to the conduct of a business may be ascertained in a particularly simple manner and without the requirement of applying cumbersome mathematical calculations. The invention consists of an instrument comprising several rulers adjustable relatively to each other and to the scale-provided axes of a co-ordinate system whereby the rulers adjusted to certain data will indicate the data to be ascertained.

Further objects and details of the invention will be apparent from the description given hereinafter and the accompanying drawings illustrating an embodiment thereof by way of example. In the drawings:

Figs. 1 to 5 are diagrams illustrating the principle underlying the invention.

Fig. 7 is a side elevation thereof.

Fig. 8 is a cross-section along line 8—8 of Fig. 7.

Fig. 9 is a bottom plan view of a portion of the instrument on a larger scale.

Fig. 10 is a cross-section along line 10—10 of Fig. 9.

Fig. 11 is a bottom plan view of another portion of the instrument.

Fig. 12 is a section along line 12—12 of Fig. 11.

Fig. 13 is a section along line 13—13 of Fig. 11.

Figure 1:
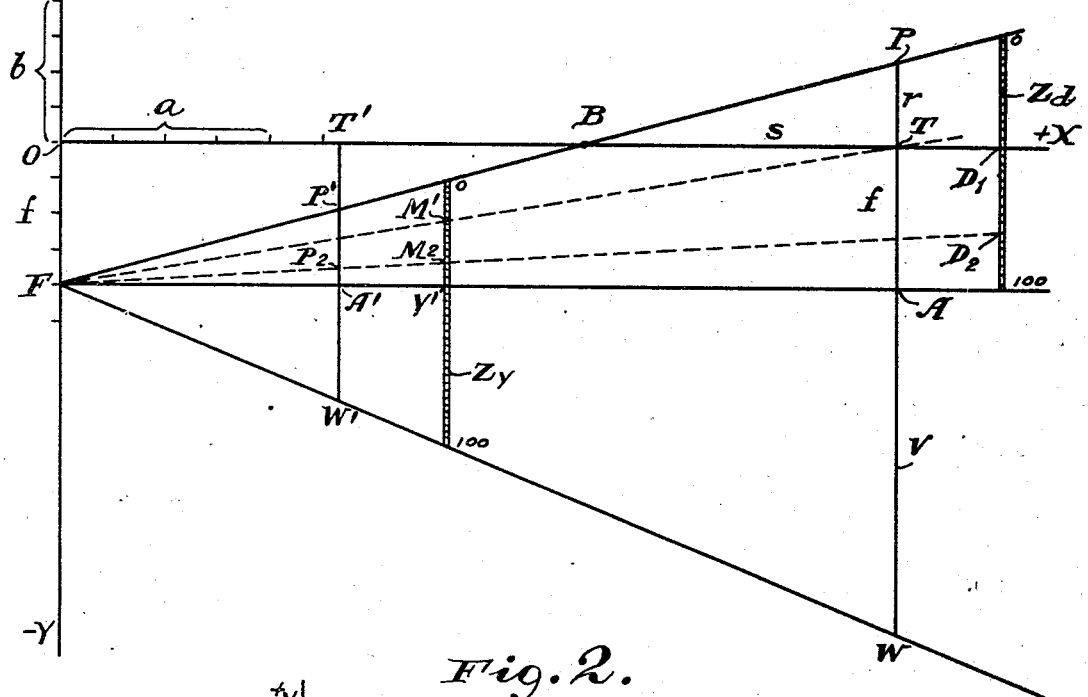

In the diagram of Fig. 1 a rectangular co-ordinate system is shown with the positive leg of the $x$-axis intersecting the $y$-axis in the zero point O and thereby determining the positive leg $+y$ and the negative leg $-y$. Each of the axes is provided with a scale only part of which is indicated and the length of the increment of the scale of the $x$-axis is denoted by $a$ and that of the $y$-axis by $b$. The scale of the $x$-axis is used to indicate volume of production or sales, and that of the $y$-axis to indicate costs and profit or loss. The denomination of both scales may be dollars or any other unit of measure as desired. The purpose of the diagram is to show the relation between the costs, fixed and variable, the sales, and the profits and losses of the particular business for which the diagram is made. In considering this relation, it may be assumed that the variable costs increase and decrease in direct proportion to the sales. Should this assumption be incorrect in a particular case, it will be easy to make the diagram correspond to the facts. However, we have found that cases requiring such adaptation are exceptional and, for that reason, will not require special attention in the subsequent explanation. Moreover, the users of instruments according to the invention can be assumed to have sufficient knowledge and experience in business accounting so that they will not encounter any difficulties in making proper use of the instrument in the rare cases where deviations from the afore-mentioned proportionality are large enough to deserve consideration.

The diagram according to Fig. 1 is so prepared that all costs and losses appear in the $+x, -y$ quadrant, i. e., below the $x$-axis of the co-ordinate system; whereas profits are shown in the $+x, +y$ quadrant, i. e., above the $x$-axis. Now, in order to explain the diagram, let it be assumed that in the business under consideration the total sales equal to $s$ dollars were made in a certain period and that these sales required the expenditure of $f$ dollars in fixed costs and $v$ dollars in variable costs; hence, the profit is $$r = s - (f+v)$$

If $f+v$ is greater than $s$, $r$ will have a negative sign indicating loss rather than profit. By setting off the value of $s$ in scale measure of the $x$-axis along the latter from the point O, the point T is determined. Point F is found by setting off on the $-y$ leg the value $f$ in the scale measure of the $y$-axis so that $OF = f$, and similarly TW is made equal to $f+v$. Upward of point T line WT is extended to point P so selected that $PT = r$. Then, the lines FW, FP and FG are plotted; FA being parallel to the $x$-axis. According to the construction of this diagram, $TA = f$; $AW = v$ and $$PW = \frac{b}{a} \cdot OT$$

wherein $$\frac{b}{a}$$

is the ratio of the increment of the scale of the $y$-axis over that of the scale of the $x$-axis. Hence, with $$z = \frac{a}{b}$$

we find $OT = zPW$.

Line FP is termed the result line of the business under consideration; it is characterized by the fact that the ordinate of any point of that line equals the profit or loss of the business to be obtained from sales corresponding to the abscissa of said point, for instance, sales OT will result in a profit PT, and sales OT' will result in a loss P'T'. The point of intersection B of the result line FP with the x-axis is the so-called break-even point indicating that volume of sales which is equal to the sum of the fixed and variable costs appertaining to such sales. This sales volume will be referred to hereinafter as the "break-even volume." It will be clear that any volume of sales in excess of the break-even volume will result in a profit, whereas a sales volume of less than the amount OB will result in a loss. Hence, if the fixed and variable costs appertaining to a certain sales volume are known, the entire diagram can be plotted showing the break-even point and volume, the total costs, the variable costs, and the profit or loss resulting from any other contemplated sales volume.

In addition to the knowledge of the relation of sales, fixed and variable costs, and profit or loss, there are of particular interest in the analysis and management of a business three ratios which we have termed the specific yield, the margin of profit, and the determinant. The specific yield is defined as the profit or loss resulting from a particular sales volume over the difference between such sales volume and the break-even volume. The margin of profit is the profit or loss over total sales. The determinant is the amount the sales are in excess or fall short of the break-even volume over the total sales.

In order to find the specific yield Y in the diagram of Fig. 1, the conditions prevailing in connection with the sales volume $s$ may be selected as an example. The sales $s$ correspond to the distance OT, the profit is represented by the distance PT and the difference between the sales volume $s$ and the break-even volume is represented by the distance BT. However, in order to find the specific yield determined by these conditions it must be considered that in the present example the scales of the ordinates and abscissae of the system differ from each other. Therefore, the specific yield must be written as $$Y = \frac{zPT}{BT}$$

wherein $$z = \frac{a}{b}$$

as hereinbefore stated. Owing to the similarity of the triangles BPT and FPA it follows that $$\frac{z.PT}{BT} = \frac{zPA}{FA} = \frac{zPA}{OT}$$

Considering further that the volume of the total sales is equal to the sum of variable costs plus fixed costs plus profit, we may write $OT = zPW$. Hence, $$\frac{zPA}{OT} = \frac{zPA}{zPW} \text{ and } Y = \frac{PA}{PW}$$

Consequently, we find that the specific yield is represented by the ratio of the length PA to the length PW. In order to measure this ratio a vertical slide or ruler Z of any desired predetermined length may be used which is provided with a scale preferable divided into 100 equal parts. If this slide or ruler is brought into the position Zy where it is parallel to the y-axis, and its zero mark and its 100 mark respectively coincide with the lines FP and FW, then line FA will directly indicate at $Y_1$ on the scale of the ruler the specific yield in per cent. The correctness of this statement follows from the similarity of the triangle PWF and the triangle having $Z_y$ as its base and point F as apex. A slide or ruler Z of the mentioned type is more fully described in the patent application Serial No. 356,432, filed September 12, 1940.

Figure 2:
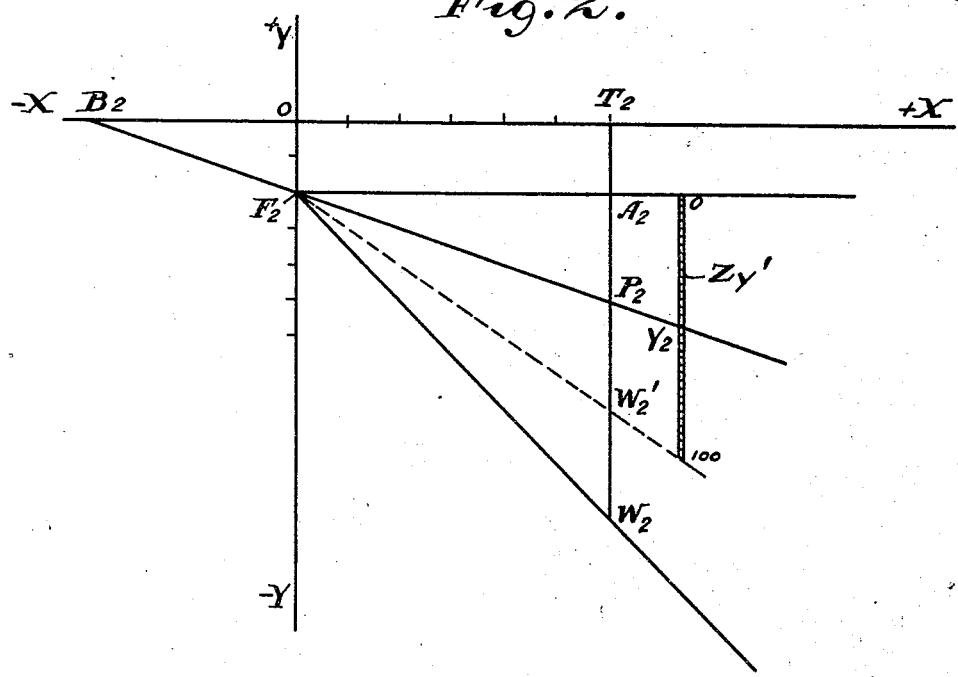

It will be clear that the specific yield has a theoretical maximum equal to $+1$ when the entire amount of sales above the break-even point is profit. This would be possible only if there were no variable costs so that FW would coincide with FA, and in that event the break-even volume would be equal to the fixed costs. The specific yield becomes zero when the break-even point is in the infinity. In that case line FP coincides with FA, and there will be a loss equal to the amount of the fixed costs no matter what sales volume is reached. If the specific yield becomes negative then the break-even point will also be negative and the loss will always be greater than the fixed cost. In such a case the break-even point would not appear in an instrument which provides only for the positive leg of the x-axis. Nevertheless, the pertaining specific yield can be found in the $+x, -y$ quadrant of the system. This is shown in the diagram of Fig. 2. In this diagram for a sales volume corresponding to $OT_2$ the fixed costs are represented by the length $OF_2$ or $T_2A_2$, the variable costs by $A_2W_2$ and the loss by $T_2P_2$. Hence, the break-even point is at $B_2$, and the specific yield is $$Y = \frac{z.(-T_2P_2)}{OT_2 - (-OB_2)} = \frac{-z.T_2P_2}{B_2T_2}$$

Considering the similar triangles $B_2T_2P_2$ and $F_2A_2P_2$, we find $$\frac{T_2P_2}{B_2T_2} = \frac{A_2P_2}{F_2A_2}$$

Owing to the construction of the diagram, $$F_2A_2 = OT_2 = z(T_2W_2 - T_2P_2) = z.P_2W_2$$

Hence, $$Y = -\frac{z.A_2P_2}{zP_2W_2} = -\frac{A_2P_2}{P_2W_2}$$

This value can be measured in various manners, of which the following is preferred. An auxiliary line is plotted through the points $F_2$ and $W'_2$, the latter being determined by making $$A_2W'_2 = P_2W_2$$

Then, the slide Z may be applied between the lines $F_2A_2$ and $F_2W'_2$ in the position $Z'y$, whereupon line $F_2P_2$ will indicate the specific yield on the scale of the slide at $Y_2$. From the foregoing it will be clear that the lower limit of the specific yield is $-1$. This value will be attained when the line $F_2P_2$ coincides with the line $F_2W_2$. Thus, the specific yield can be found and measured within its entire range between $+1$ and $-1$.

In a similar manner the margin of profit can be found in the diagram of Fig. 1. According to its definition, as the ratio of profit or loss over the total sales, its value M is $$M = \frac{z.PT}{OT}$$

Since, however, $OT = z.PW$, $$M = \frac{z.PT}{z.PW} = \frac{PT}{PW}$$

In order to measure the margin of profit, the line FT is plotted. This line intersects the vertical slide Z at the desired point $M_1$ of its scale when the slide is in the afore-mentioned position $Z_y$. The theoretical maximum of the margin of profit is $+1$; it is zero in the break-even point and diminishes to $-\infty$ when the sales decrease from the break-even volume to zero. The method described before of finding the margin of profit is applicable only if the margin of profit is positive. If it is negative between the values zero and $-1$, for instance for the sales volume T' in the diagram of Fig. 1, the point $P_2$ is determined so that $P'P_2=T'P'$. Then the line $FP_2$ will intersect the slide in the position $Z_y$ at the desired point $M_2$ of the slide scale to be read with a negative sign. The correctness of this statement can be proven as follows: According to the definition the margin of profit for the sales volume T' is $$M = -\frac{z.T'P'}{OT'}$$

with $z.P'W'=OT'$ $$M = -\frac{T'P'}{P'W'}$$

or since $T'P'=P'P_2$ $$M = -\frac{P'P_2}{P'W'}$$

This ratio is indicated at $M_2$ owing to the similarity of the triangle FP'W' and the triangle having its apex at F and its base in the slide $Z_y$. The values of the margin of profit below $-1$ can be measured in a somewhat modified method. Since, however, these values do not frequently occur the explanation of such modified method appears to be superfluous.

The determinant, finally, is the ratio of the sales in excess of the break-even volume over total sales or the ratio of the amount by which the sales fall short of the break-even volume over total sales. Its limits are also $+1$ and $-\infty$ within the range of positive break-even points. A positive determinant can be found in the following manner: Considering the sales volume T, the determinant $$D=\frac{BT}{OT}$$

Considering further the triangles PBT and PFA, $$D=\frac{PT}{PA}$$

Therefore, by placing the slide Z in the position $Z_d$ where its ends coincide with the lines FP and FA respectively the determinant for the sales volume T is indicated on the slide scale by the $x$-axis intersecting that scale at $D_1$.

If the determinant is negative, this method must be slightly modified. For instance, if in the diagram of Fig. 1 the negative determinant is to be found for the point T', we have $$D = -\frac{T'B}{OT'} = -\frac{T'B}{FA'}$$

Owing to the similarity of the triangles P'T'B and P'A'F, $$\frac{T'B}{FA'}=\frac{T'P'}{P'A'}$$

According to the foregoing we have also $$T'P'=P'P_2$$

Therefore, the determinant for the point T' can be written as $$D = -\frac{P'P_2}{P'A'}$$

and is indicated at $D_2$ by the extension of line $FP_2$ on the slide scale in the position $Z_d$.

A particular feature of the diagram hereinbefore discussed is the fixed relation of the length of the abscissa of any sales volume to the sum of the ordinate lengths for fixed costs, variable costs and profit or loss which appertain to such sales volume. This permits construction of the diagram and reading of the three characteristic ratios, viz. Y, M and D in a simplified manner illustrated in the diagram of Fig. 3 in which the $x$ and $y$ axes, the result line and total cost line are shown in positions similar to Fig. 1.

It has been stated hereinbefore that owing to the construction of the diagram, $OT=z.PW$. This equation is valid no matter how the amount of the fixed and/or the variable costs vary for a given turnover. If $\angle AFW$ is denoted by $\alpha$ and $\angle PFA$ by $\beta$ then $$\tan \alpha + \tan \beta = \frac{AW+PA}{FA}$$

Considering that $$AW+PA = PW = \frac{OT}{z}$$

and $FA=OT$ we find $$\tan \alpha + \tan \beta = \frac{1}{z}$$

Hence, the sum of the tangents of the angles $\alpha$ and $\beta$ is dependent only on the ratio of the increments of the scales on the $x$-axis and the $y$-axis.

Now, in view of this equation the result line FP and the total cost line FW can be represented by rigid elements which have a common pivot F shiftable along the $y$-axis. It is further possible to introduce a third rigid element of any desired predetermined length, for instance GE, which is parallel to the $y$-axis and vertically movable up and down at a constant distance from the latter equivalent to $OL=z.GE$, and with its ends in constant connection with the two first-named elements. Then it will be necessary only to adjust the total cost line according to the fixed and variable costs appertaining to any sales volume of a business, whereupon the element representing the result line will be automatically adjusted in its correct position.

This element GE may also be made useful for measuring the specific yield and the margin of profit by applying thereto a scale permitting the reading of per cents of its length between the points G and E, for instance, by dividing that length in 100 equal parts with zero at the point G and "100" at point E. From the foregoing it will be clear that the point J of such scale in which the horizontal through F intersects the line GE directly indicates the specific yield of a business whose diagram corresponds to that of Fig. 3. Furthermore, the point H being the intersection of the line FT with GE indicates the margin of profit. If the specific yield is negative, then, according to the diagram of Fig. 4 a line may be plotted through $F_2$ and the point $W'_2$ whose distance from $P'_2$ equals $A_2P'_2$. The intersection $H_2$ of that line with the aforementioned third element, now in the position $G_2E_2$ will indicate the negative specific yield. If the margin of profit is negative as, for instance, in case of the turnover OT' in Fig. 3, a line may be plotted through F and a point $P_2$ which is so defined that its distance from P' equals T'P'. Then, the reading of point H' is the negative margin of profit.

Figure 3:
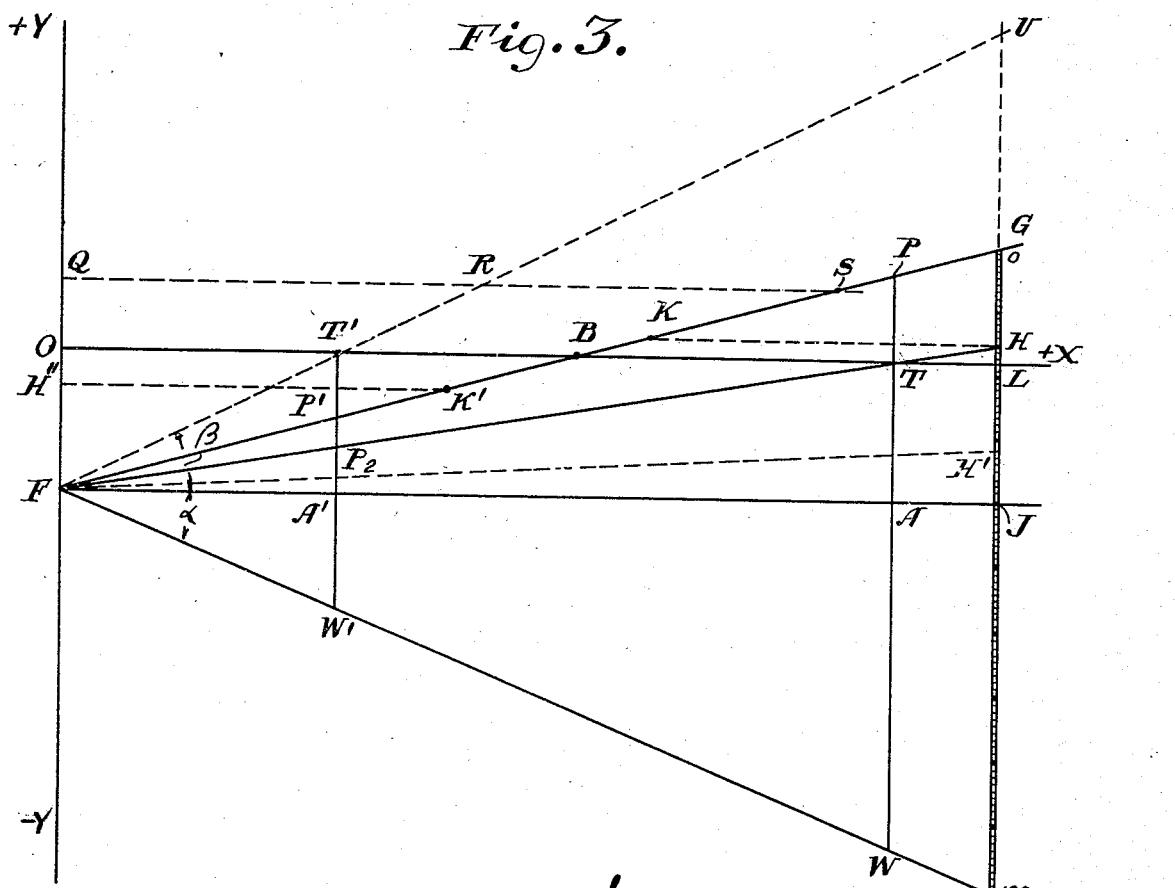
Figure 4:
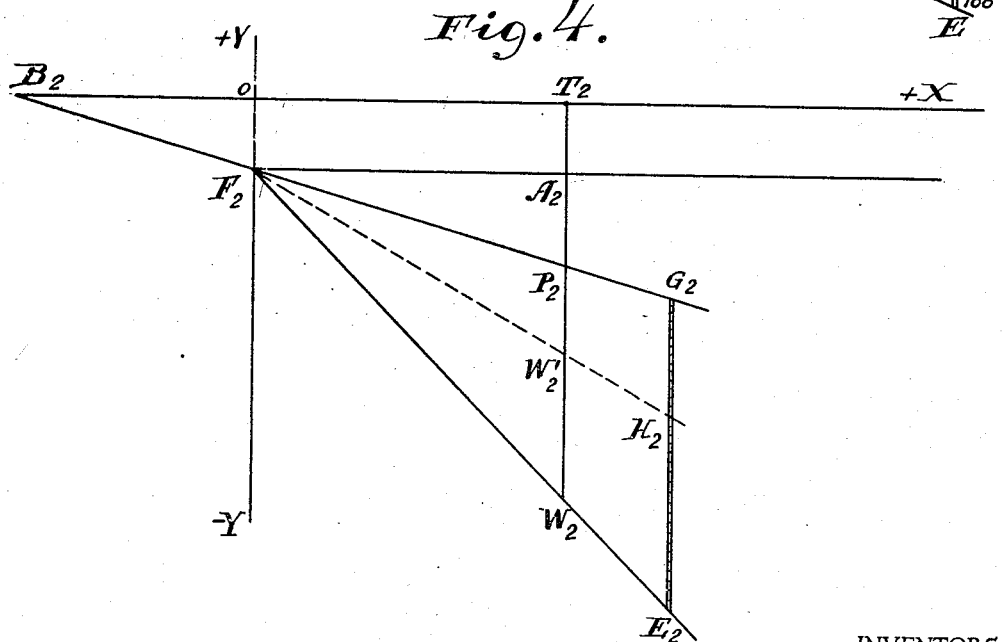
Figure 6:
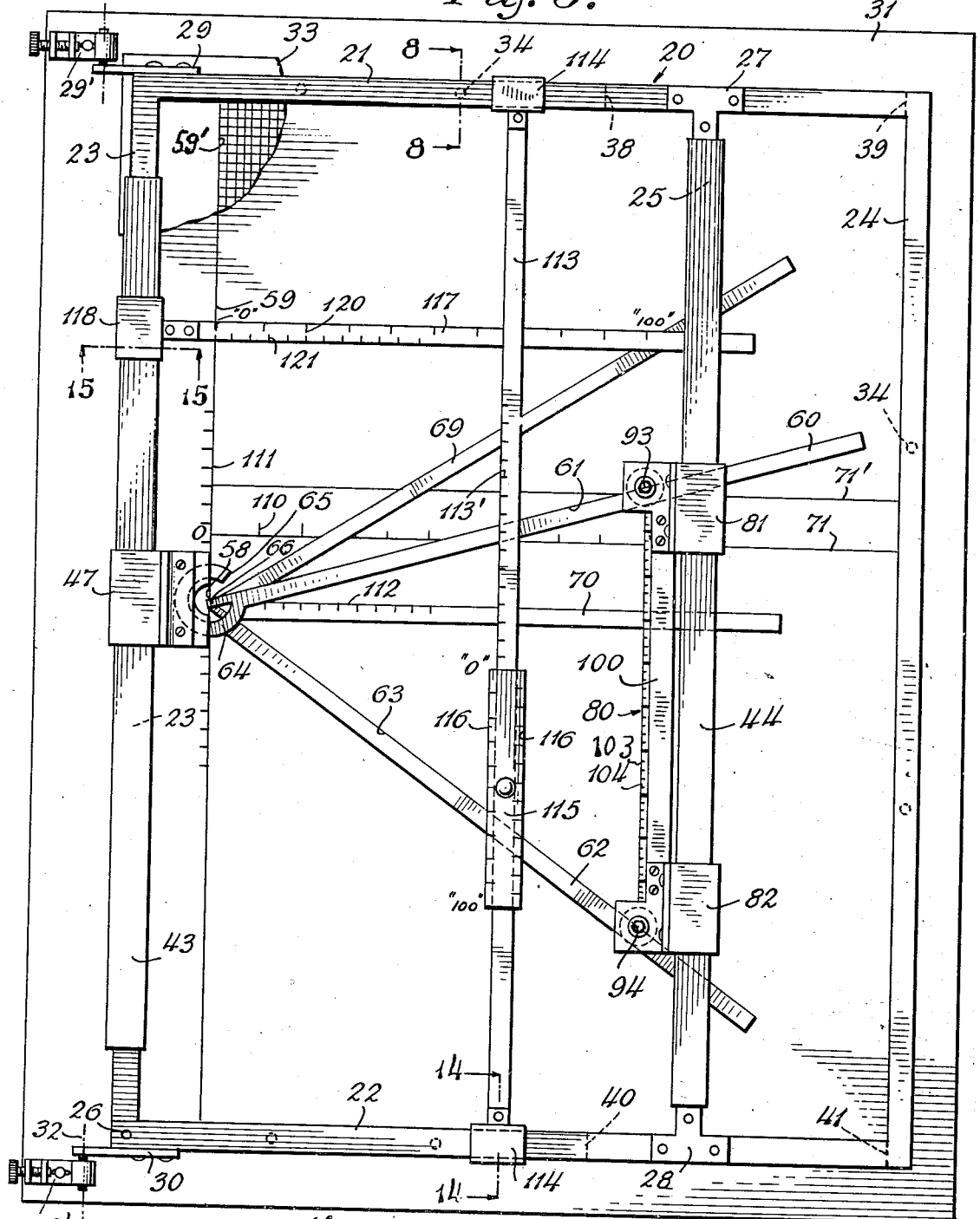
Fig. 6 is a top plan view of an instrument according to the invention in its preferred form.

The determinant may either be found with the aid of the slide Z of Fig. 1, or preferably according to another principle. The determinant has been defined as the ratio of the sales in excess of the break-even volume over total sales. Thus, the determinant for the sales volume T in Fig. 3 is the ratio $$\frac{BT}{OT}$$

A horizontal line is plotted through H which intersects the result line in K. Now, we have the equation $$\frac{BT}{OT} = \frac{KH}{OL}$$

This follows from $$\frac{PT}{TA} = \frac{GH}{HJ}$$

and $FJ=OL$. Consequently, if OL is provided with a scale divided in 100 equal parts similar to GE and with zero at point L and "100" at point O, the determinant can be read by comparison of the length KH with such per cent scale. This method is applicable for a positive determinant.

If the determinant is negative, for instance, the determinant for a sales volume OT', the line FT' may be plotted. Then a horizontal scale having equal increments may be so positioned that the ends of the first unit length of the scale are positioned on the y-axis and the line FT' respectively. In the example of Fig. 3, it is assumed that the unit length of such scale is QR. The scale thus positioned intersects the result line in point S. If, then, 1 is subtracted from the reading of the scale at S, the result will be the negative determinant for the turnover OT' owing to $$\frac{BT'}{OT'} = \frac{QS-QR}{QR}$$

However, another consideration leads to an even simpler method of establishing the value of the determinant if the latter is within the limits of $+1$ and $-1$.

The negative determinant between these limits can be found in a manner similar to that explained with respect to the positive determinant. This is shown in Fig. 5. According to the foregoing, the negative determinant for the sales volume T' in Fig. 5 is $$-\frac{BT'}{OT'}$$

If now a point Q' on GJ is so selected that $HQ'=GH$ and then a parallel to OL is plotted through Q' which intersects FH in S', then $$\frac{S'Q'}{FJ}$$

is equal to $$\frac{BT'}{OT'}$$

Hence, the negative determinant can be measured with the same means as the positive, that is to say, with a scale of the length OL whose zero mark is at the end corresponding to L and whose "100" mark is on the end corresponding to O. The correctness of this statement can be proven as follows: In Fig. 5, HQ is plotted parallel to OL; consequently, $$\frac{T'B}{OT'} = \frac{HR'}{QR'} = \frac{GH}{FQ}$$

In the triangles FHJ and S'HQ', $HJ=FQ$ and $HQ'=GH$ according to the construction of the diagram. Consequently, $$\frac{T'B}{OT'} = \frac{HQ'}{HJ} = \frac{Q'S'}{JF}$$

Since $FJ=OL$, the value $-Q'S'$ measured with the aid of the mentioned scale is the negative determinant.

In many instances, however, it is more convenient to apply a scale whose zero point coincides with the y-axis rather than with GJ. This is also possible. According to its definition, the positive determinant of the sales volume T in Fig. 3 is $$\frac{BT}{OT}$$

Considering that $$\frac{BT}{OB} = \frac{KH}{FJ}$$

as hereinbefore disclosed, the following method may be applied: Make $FH''=GH$ and plot $H''K'$ parallel to OL, then $H''K'$ will be a measure for the determinant which may be read on a scale having its zero point on the y-axis and its "100" mark on the line GJ. Similarly, with reference to Fig. 5, the negative determinant $$-\frac{BT'}{OT'}$$

of the sales volume T' can be read as the length $-Q''S''$ wherein $FQ''$ is equal to GH and the parallel to OL is plotted through Q''.

Figs. 6 to 15 illustrate the preferred form of an instrument according to the present invention and which embodies the features mentioned in the foregoing disclosure of the principle on which its structure is based. The instrument comprises a frame in general denoted with the numeral 20 and being composed of an upper bar 21, a lower bar 22, two side bars 23 and 24 respectively, and an intermediate bar 25 parallel to bar 23. The bars 21, 22, 23 and 24 are jointed at their corners as indicated at 26 for the lower left-hand corner of the frame, and the bar 25 is secured in its position to bars 21 and 22 by means of jointing pieces 27 and 28 respectively. Hinges 29 and 30 are secured to the frame bars or members 21 and 22 respectively on the one hand and attached to a base board 31 on the other hand. The hinge axis 32 is arranged at a short distance from the outer edge of the bar 23 in order to facilitate the insertion of a sheet of drawing paper if such is to be used, only a small portion of such paper being shown at 33. Furthermore, adjustment devices 29' and 30' may be interpositioned between the board and the hinges proper. By manipulating the thumbscrews of these devices inaccuracies in the relative position of the frame and board 31 or the sheet 33 on said board may be corrected. At suitable points, e. g., at 34, an upright post 35 may be secured to the board 31 as shown in Fig. 8 and project through a corresponding hole 36 when the frame is turned down on the base. The posts 35 serve to secure the paper sheet 33 in correct position relatively to the frame by passing through corresponding perforations 37 of the paper. For reasons to be explained hereinafter, the bars 21 and 22 are set off at the bottom between 38 and 39 and between 40 and 41 respectively so as to leave a gap 42 between the bottom of the respective frame member and the board 31 as clearly shown in Fig. 7. In order to combine strength with low weight the individual frame members of the illustrated embodiment consist of square tubes. However, it will be understood that any other suitable cross-section may be applied with satisfying result. The bars 23 and 25 are provided with means or are so shaped as to constitute parallel guide rails for other parts of the instrument described hereinafter. For this purpose, strips 43 and 44 having exactly parallel edges are secured to the tops of the bars 23 and 25 respectively as indicated at 45 and 46 in Figs. 10 and 11. The strips 43 and 44 project laterally from the associated bars.

On bar 23, a slide 47 is mounted so as to be shiftable along the bar. In the illustrated embodiment, the slide comprises a channel piece 48 having inner flank pieces 49 and 50 secured thereto, for instance, by screws 51 as clearly shown in Figs. 9 and 10. The flank pieces engage with their upper edges the bottom surfaces of the projecting strips, and a spring 52 is inserted between the strip 43 and the inner face of the channel 48 so as to insure parallel guidance of the slide along bar 23 and strip 43. An angular piece 53 is secured with one of its legs to the outside of one of the flanges of the channel 48 as indicated at 54, and a pivot piece 55 is secured to the other leg of the piece 53. The pivot piece 55 has a semi-circular, annular groove 56 in its bottom surface, and a semi-circular recess 56' of its outer edge 57. The arrangement is such that the common center 58 of the groove 56 and of the recess 56' is located on a line coinciding with the edge 57. The center 58 moving parallel to the bar 23 when the slide 47 is shifted along the latter is determinative of the $y$-axis of the coordinate system in relation to which members of the instrument are intended to be adjusted. A line 59 indicating the path of the center 58 and thus the $y$-axis may be provided on the board 31. Similarly, the paper sheet 33, preferably a squared graph paper, may be provided with a line 59' coinciding with line 59 when the paper sheet is inserted in its position predetermined by the posts 35 and perforations 37 shown in Fig. 8.

A plurality of rulers, at least two, are provided which are pivoted about the center 58. One of the rulers, denoted by 60, is the "result" ruler whose edge 61 is indicative of the afore-mentioned result line, and another one 62 is destined to represent with its edge 63 the afore-mentioned "total cost line." Each ruler has a ring-shaped end 64 and 64 respectively of approximately three-quarters of a circle and so shaped as to fit into the groove 56 of the slide 47. In continuation of the ruling edges 61 and 63, the rulers may have narrow tongues 66 and 67 respectively which extend from their annular portions inwardly at least as far as the center 58. Through the remaining clearance 68 marks on the sheet of paper 33 or on the board 31 may be observed when the slide is to be adjusted so that the center 58 through which the ruling edges 61 and 62 pass coincides with a selected one of such marks. Although instead of the particular type of pivot hereinbefore described any other suitable and conventional type may be used, we prefer the illustrated type because it permits the drawing of a line at least along one of the said edges uninterruptedly to the center point 58, and even beyond that point. In addition to the rulers 61 and 62 other rulers pivoted in a like or similar manner about center 58, may be provided if it is the intention to indicate by individual rulers selected groups of variable costs as part of the total costs. It is advisable to apply at least one such additional ruler 69 which may not only serve the mentioned purpose but may be used in particular to establish such lines as FT in Figs. 1 and 3 or certain other lines discussed in connection with the diagrams. Furthermore, a horizontal ruler 70 may be rigidly secured to the slide 47 so as to establish a parallel to the $x$-axis of the system, which axis may be indicated by a line 71 on the board and/or the paper sheet 33. The horizontal ruler 70 may be made in one piece with a bottom cover plate 72 screwed to the bottom of pivot piece 55 at 73 after the rulers 69, 60 and 62 have been placed in the annular groove 56'. All the rulers should be of relatively very thin material, preferably steel or other metal, so that even the top ones are as close to the underlying surface of the board 31 or paper 33 as possible. Now, it will be clear that if the slide 47 is moved up or down the bar 23 the pivot at 58 with all the mentioned rulers attached thereto will be shifted along the $y$-axis of the system, and the rulers 60, 62 and 69 can be turned about that pivot an angle of a size depending on the shape of the clearance 68 and other parts of the assembly. In other words, the required movability of the rulers can be easily obtained by correct dimensioning of the cooperating parts.

Means may be provided whereby the members 60 and 62 with respect to their edges 61 and 63 are so held angularly spaced from each other than the equation $\tan \alpha + \tan \beta = z$ discussed hereinbefore in connection with Fig. 3 will be fulfilled. In other words, means are provided whereby at a predetermined distance from the $y$-axis, the spacing of the lines 61 and 63 is maintained constant. This is accomplished in the illustrated embodiment in the following manner:

On bar 25 with strip 44, a carriage 80 is shiftably mounted which comprises two slides 81 and 82 in tandem arrangement. Each of the two slides comprises, similar to the slide 47, a channel piece 83 with inner flank pieces 84 and 85 and a spring 86 as clearly shown in Fig. 12. An angular piece 87 is riveted at 88 with its upright leg to the channel 83. The other leg recessed at 89 has a wider portion 90 and a narrower portion 91. The wider portion is provided with a hole 92 whose center constitutes a pivot axis denoted by 93 in slide 81 and by 94 in slide 82. A pivot piece 95 having a restricted head 96 is passed through the hole 92 as more clearly shown in Fig. 13 and is held in position with respect to the leg portion 90 by means of a headed screw 97 with washer 98. The structure of the pivot at 93 is similar to that at 94. The lower surface of the piece 95 is provided with a groove 99, whose one flank passes diametrically through the pertaining pivot axis 93 or 94; and which has a width equal to that of the rulers 60 and 62. Ruler 60 is slidably fitted into the groove 99 of the slide 81 and ruler 62 is slidably fitted into that of slide 82 so that the ruler edges 61 and 62 engage the pertaining groove flank which passes through the pivot axis of the respective pivot piece 95. Means may be provided to prevent the rulers from dropping out of their pivot pieces. For this purpose, at least one of the groove flanks, e. g. 100, may be dove-tailed and the corresponding edges of the rulers may be beveled over that length which may come into engagement with the pivot pieces.

The two narrower portions 91 of the two slides 81 and 82 are rigidly connected to each other by a flat piece 101 riveted or otherwise secured thereto as indicated at 102. Piece 101 has a straight edge 103 parallel to the $y$-axis and in line with the two pivot centers 93 and 94. This edge 103 is provided with a percentage scale 104, meaning that the total distance between the points 93 and 94 is divided in preferably one hundred equal parts with the "zero" mark at 93 and "100" mark at 94. Now, it will be clear that if the carriage 80 is shifted along bar 25 while slide 47 is held in any desired position in relation to frame bar 23, the rulers 60 and 62 will be swung about the slide pivot 58 and will simultaneously slide in the grooves 99 and, thus, turn the pivot pieces 95. In other words, at a predetermined horizontal distance from the pivot point 58, the rulers are spaced a predetermined distance defined by the distance of the pivot axes 93 and 94 from each other. In order to permit an adjustment of the various members within sufficiently wide limits the rulers 60 and 62 are of such a length that they protrude into the space between the frame bars 25 and 24. Similarly, the rulers 69 and 70 may extend beyond the bar 25. To allow this, frame bar 25 is spaced from the top surface of the board 31 as clearly shown at 105 in Fig. 12, and the rulers are passed underneath the bar 25. For a similar reason, the aforementioned recesses 42 are provided between two points 38 and 39 on bar 21 and between points 40 and 41 on bar 22.

From the above discussion of the diagram of Fig. 3 it will be apparent that the distance of the pivots 93 and 94 from each other may be freely selected. However, the ratio of the distance of point 58 from the edge 103 over the distance from 93 to 94 is determinative of the value $z$, i. e., of the ratio of the increment of a scale to be applied to the $x$-axis over the increment of a scale to be applied to the $y$-axis. Reversely, if the said increments are pre-selected the ratio of the mentioned distances must be equal to the ratio of the increments. In most instances, it will be preferred to apply equal increments to both the $x$- and $y$-axes of the system whereby the value $z$ is equal to 1. In that event, the distance from point 58 to the line 93—94 must be equal to the distance 93 to 94. This is shown in the illustrated embodiment. However, it is to be understood according to the foregoing that the two distances may differ from each other in which case it is only necessary to select the ratio of the co-ordinate increments accordingly. Furthermore, it will be understood that in no event is it required that the increments of the scale 104 be equal to those of the $y$-axis. On the contrary, in certain cases it may be most convenient to use for the co-ordinate axes increments different from those of the scale 104 which as stated above is preferably a percentage scale having an increment equal to one-hundredth of the distance from 93 to 94.

Figures 14, 15:
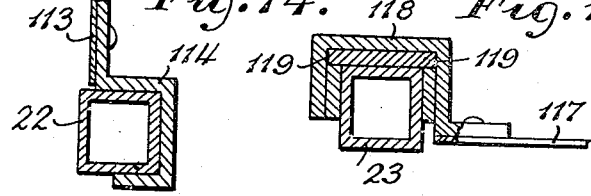
Fig. 14 is a section along line 14—14 of Fig. 6.
Fig. 15 is a section along line 15—15 of Fig. 6.

Portions of the afore-mentioned scales of the $x$- and $y$-axes are indicated at 110 and 111 respectively as applied to the board. If a paper sheet 33 is used it is advisable to have them printed on the latter in order to facilitate the application of the instrument. Furthermore, a scale 112 similar to that of the $x$-axis may be provided on the horizontal ruler 112. For many purposes of use it is advisable to provide a shiftable vertical ruler and a shiftable horizontal ruler in addition to the rulers hereinbefore described. Since, however, these additional rulers are not always needed it is preferred to mount them detachably on suitable frame members. In the illustrated embodiment such vertical ruler 113 is secured to two channel-shaped slides 114 guided along the flanks of the bars 21 and 22 respectively. Thus, the ruler 113 may be easily put on and removed from the instrument as the user may desire. A scale 113' may be applied to the ruler having its zero point coinciding with the $x$-axis and counting upward and downward as the scale of the $y$-axis. An additional slide 115 shiftable along the vertical ruler 113 may be provided. Such slide with percentage scale 116 on one or either side has been more fully described in the afore-mentioned application, Serial No. 356,432 filed September 12, 1940. The additional horizontal ruler 117 is secured to a slide 118 which may consist of a channel interiorly recessed at 119 as shown in Fig. 15 so as to embrace the guide strip 43 of the bar 23. In order to permit the slide to be brought into operative position, the strip 43 may end at a sufficient distance from the bars 21 and 22. Then the slide 118 can first be placed on one of the ends of the bar 23 which are not covered by the strip 43 and, then, shifted along that bar so that the strip will engage the recesses 119. The free end of the ruler 117 is passed underneath the bar 25. In accordance with certain purposes of ruler 117 a percentage scale 120 may be applied thereto having its "zero" mark co-incident with the $y$-axis and its "100" mark at a distance therefrom equal to the distance of point 58 from the edge 103. Another scale 121 may be also provided on ruler 117, whose increments are equal to those of the $x$-axis.

Now, in using the instrument according to the present invention, either the location of the $x$-axis may be considered as stationary and the pivot point 58 movable in relation thereto in order to adjust the distance $f$ of the diagrams Figs. 1 and 3, or the $x$-axis may be movable in relation to the point 58 while the latter is in a fixed position. In the case of the first alternative line 71 or an equivalent line on the paper sheet 33 is useful as $x$-axis in relation to which the point 58 may be adjusted by shifting the slide 47 along the bar 23. In the other case, the slide 47 may be held or made stationary in relation to the bar 23 and the adjustable $x$-axis may be represented by the edge of the shiftable ruler 117 or by a line on the board 31 or graph paper 33 at the desired distance from 58 and selected from a plurality of parallel lines such as shown at 71 and 71'. However, the first alternative is preferable because it does not require, as in the second case, a change of the zero point of the system from which the scale of the $y$-axis must count. In other respects, there are no essential differences between the mentioned alternatives. For this reason, only the first one will be described hereinafter.

If a graph paper 33 is to be used, the frame 20 is swung open, i. e. away from the board 31, about the hinges 29 and 30. The paper sheet is placed on the board with its perforations 37 in engagement with the pins or posts 35, and the frame is turned on top of the paper sheet, whereby the latter is held in its correct position without substantial strain at the perforations. Then slide 47 is shifted to the desired distance of the point 58 from the $x$-axis, i. e. line 71, according to the fixed costs of the business under consideration. Thereafter, ruler 62 is to be so turned about pivot 58 that its edge 63 passes through a point whose abscissa $x$ equals the contemplated sales volume, and whose ordinate $-y$ equals the total costs incidental with the sales volume in the measure of the scales of the axes. The pertaining point $(x, -y)$ may be easily determined either with the aid of the net of the graph paper or with the aid of the vertical ruler 113 shifted with its edge to the respective point $x$ on the $x$-axis. Adjustment of the ruler 62 effects also the adjustment of the ruler 60 by the intermediary of the carriage 80 with its accessorial parts. This completes the diagrams of Figs. 1 and 3 as far as the lines OT, FA, FW, FP and PW in Fig. 1 and the lines OL, FJ, FE, GE and PW in Fig. 3 are concerned. The break-even point is determined by the intersection of the ruler edge 61 with the line 71. The variable and total costs and the profit or loss for any other sales volume may be directly read as the lengths of the ordinate of a selected abscissa between edge 62 and 70, between 62 and the $x$-axis, and between the $x$-axis and the edge 61 respectively. If so desired, additional rulers of the type of ruler 69 may be so adjusted between rulers 70 and 62 as to divide the variable costs into selected groups.

The specific yield is directly readable on the scale 104 as the intersection of the top edge of ruler 70 with the edge 103. On the same scale the margin of profit is readable as the point of intersection of edge 103 with the upper edge of ruler 69 when the latter is so turned that its upper edge passes through that point on the line 71 which corresponds to the sales volume in consideration. In order to find the determinant the ruler 69 remains in the last-mentioned position. Ruler 117 is to be shifted to a position where the distance of its upper edge upwards from that of ruler 70 is equal to the distance of point 93 from the point of intersection of edge 103 with the edge of ruler 69. Then, the determinant may be read on scale 120 at the intersection of the rulers 69 and 117.

From the foregoing description it will be clear that the instrument permits the finding of certain data essential in the management of a business if the fixed and variable costs incidental to a given sales volume are known. However, and this is a highly important feature, it is also possible with the aid of the instrument to find those conditions which must prevail in order that a desired result be obtained. If, e. g. it is intended to reach a predetermined specific yield when there are fixed costs of a given amount, it will be necessary only to shift point 58 to the corresponding distance from O, and the scale 104 so that the ruler 70 intersects that scale in the point corresponding to the desired yield. Then, the co-ordinate values of sales volume, variable cost, profit and break-even point are immediately readable from the position of the various rulers in relation to each other. Similar readings as to the different factors may be obtained if the margin of profit or the determinant is one of the predetermined quantities.

Figure 16:
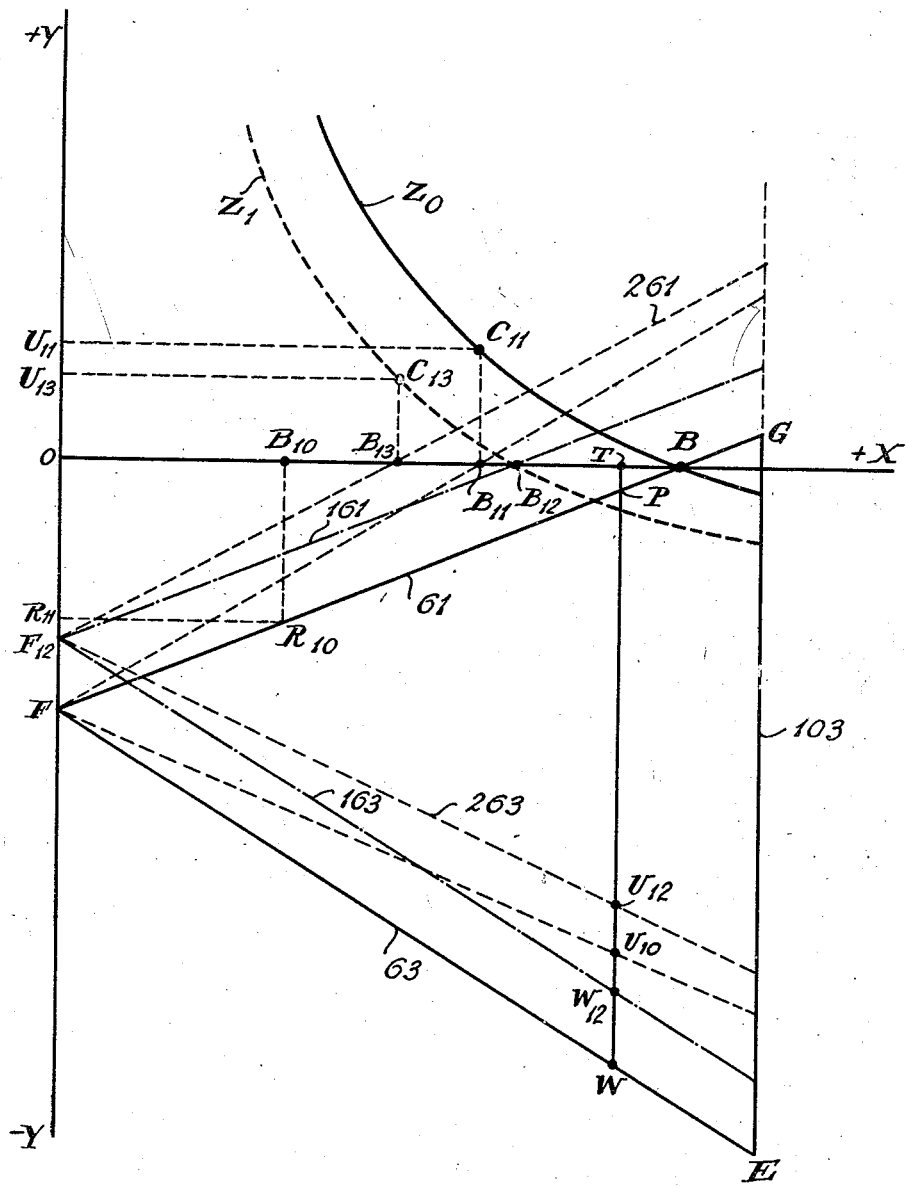
Fig. 16 is a diagram illustrating the application of the instrument for a specified purpose.

It will be unnecessary to describe further in detail the manipulation of the different members of the instrument and among them the slide 115 which corresponds to the slide Z in Figs. 1 and 2 in solving the various problems discussed in connection with the diagram of Figs. 1 to 5. It suffices to say that these problems may be solved with the disclosed means in a particularly easy manner without the requirement of making many elaborate and cumbersome calculations heretofore necessary in the analysis and management of business enterprises. A great variety of problems not above mentioned may also be solved with the described instrument. Of such problems only a specific one which has been found particularly important will be discussed hereinafter in reference to Fig. 16. In connection with the diagrams of Figs. 1 and 3, it is frequently desirable to plot the so-called "cost reduction curves" which show how the location of the break-even point on the $x$-axis changes, when, for a given sales volume, savings in fixed and/or variable costs can be made. This is illustrated in Fig. 16 where it is assumed that a certain business to be analyzed turned out a sales volume $s$ at total costs of $f+v$ wherein $f$ is the fixed costs and $v$ the variable costs. Consequently, and according to the above explanation, the slide 47 of Fig. 6 has been so shifted in Fig. 16 that the pivot 58 coincides with point F of the diagram which, in the scale measure of the system, is spaced from the "zero" point O a distance equal to the quantity $f$. Point T is so determined on the $x$-axis that its distance from O equals the quantity $s$. Finally, ruler 62 has been so turned that its edge 63 passes through W located on the ordinate of T in the $x, -y$ quadrant and spaced from T a distance according to $f+v$. Owing to the connection of the rulers 60 and 62 by means of carriage 80 in Fig. 6, the ruler edge 61 will then automatically take the position FG, where it intersects the $x$-axis in the break-even point B. The diagram shows that there is a loss corresponding to TP for the sales volume OT. Therefore, the management of the business enterprise will try to shift the break-even point towards the left in order to change the loss into a profit. This might be done by a reduction of the fixed costs. Now, the diagram directly shows without the requirement of any additional line or curve what reductions are required to shift the break-even point to a desired position; or reversely, what the location of the new break-even point will be if the fixed costs are reduced a given amount. The relation of the two values under consideration is determined by the ordinates of the line FG, so that the latter can be considered as the cost reduction line with respect to variations of the fixed costs. If, e. g., it is desired to shift the break-even point to point $B_{10}$ the length of the ordinate $B_{10}R_{10}$ of the point $R_{10}$ indicates the required savings in the scale measure. Or, if it has been established that the fixed costs can be reduced an amount corresponding to $OR_{11}$, then the length of the abscissa $R_{10}R_{11}$ is also that of the new break-even point $B_{10}$.

In order to plot the cost reduction curve for the variable costs when no change in the fixed costs takes place, the following method is recommended: Assume the saving in a case under consideration to be equal to $U_{10}W$, then turn edge 63 so as to coincide with point $U_{10}$ on the line TW whereupon the edge 61 will intersect the $x$-axis in the new break-even point $B_{11}$. If, now, the point $C_{11}$ is determined whose ordinate $C_{11}B_{11}$ is equal to $WU_{10}$ and whose abscissa $U_{11}C_{11}$ is equal to that of the new break-even point $B_{11}$, then point $C_{11}$ is a point of the desired curve $Z_0$. By applying the same method to other values of savings, more points may be determined through which the curve $Z_0$ can be plotted. According to this construction, any point $C_{11}$ of this curve indicates that the new break-even point is located on the $x$-axis vertically below point $C_{11}$, and that the distance $C_{11}B_{11}$ in scale measure corresponds to the savings in variable costs necessary to shift the break-even point from B to $B_{11}$.

A series of curves may be plotted each of which shows the shifting of the break-even point as the result of savings in variable costs if simultaneously a predetermined saving in the fixed costs takes place. Such a curve is also shown in Fig. 16 and denoted by $Z_1$. This curve is found in the following manner: First, the point F is shifted to $F_{12}$ according to the saving in fixed costs for which the curve $Z_1$ is to be plotted. This shifting should take place in such a manner that edges 63 and 61 remain parallel to their respective original positions. Their new location is 163 and 161 respectively; 163 intersects line TW in the point $W_{12}$, and 161 intersects the x-axis in point $B_{12}$. From then on, the procedure is similar to that described with reference to curve $Z_0$. Edge 163 is turned about $F_{12}$ into the position 263 where it intersects the line TW in the point $U_{12}$ spaced from $W_{12}$ a distance corresponding to a contemplated saving in variable costs. This turning of line 163 simultaneously causes turning of 161 into the position 261 defining the new break-even point $B_{13}$. The desired point of the curve $Z_1$ is, then, point $C_{13}$ whose abscissa $U_{13}C_{13}$ is equal to $OB_{13}$ and whose ordinate $C_{13}B_{13}$ is equal to $U_{12}W_{12}$. Hence, any point $C_{13}$ of the curve $Z_1$ indicates that the break-even point $B_{13}$ having the same abscissa length as $C_{13}$ can be obtained for a sales volume T if the fixed costs can be reduced an amount corresponding to $FF_{12}$ and the variable costs an amount corresponding to $C_{13}B_{13}$. In a similar manner additional curves of the type $Z_1$ may be plotted which will permit judicial selection of the most appropriate measures in order to improve the business enterprise under consideration.

It will be apparent to those skilled in the art that many alterations and modifications of the instrument hereinbefore described are within the scope of the present invention which is defined by the appended claims.

We claim:

1. An instrument for analyzing a business enterprise comprising means determinative of the two axes of a rectangular co-ordinate system, a member embodying a pivot perpendicular to the plane of the two axes of the system and movable along the first one of said system axes, two elements mounted on said pivot and being determinative each of a straight line intersecting the pivot axis, one of said elements being angularly adjustable in the quadrant between said first system axis and the one side of a line through the pivot axis and parallel to the second system axis, and the other element being angularly adjustable in the quadrant between the first system axis and the other side of said parallel.

2. An instrument for analyzing a business enterprise comprising a first means determinative of the positive leg and the negative leg of the first one of the two axes of a co-ordinate system, second means determinative of the positive leg of the second axis of said system, third means embodying a pivot whose axis intersects said first system axis at right angles to the plane of the two axes of said system, one of said second and third means being variable as to its distance from the other one, and two elements mounted on said pivot and being determinative each of a straight line intersecting said pivot axis, one of said elements being angularly adjustable in the quadrant between the first system axis and the one side of a parallel to said second system axis through said pivot axis, and the second element being angularly adjustable in the quadrant between the first system axis and the other side of said parallel.

3. An instrument for analyzing a business enterprise comprising a first member determinative of the positive leg and the negative leg of the first one of the two axes of a co-ordinate system, a second member determinative of the positive leg of the second axis of said system, a third member embodying a pivot whose axis intersects said first system axis at right angles to the plane of the two axes of said system, said third member being adjustable as to its distance from said second system axis, and two elements mounted on said pivot and being determinative each of a straight line intersecting said pivot axis, one of said elements being angularly adjustable in the quadrant between the first system axis and the one side of a parallel to said second system axis through said pivot axis, and the second element being angularly adjustable in the quadrant between the first system axis and the other side of said parallel.

4. An instrument for analyzing a business enterprise comprising a first member determinative of the positive leg and the negative leg of the first one of the two axes of a co-ordinate system, a second member determinative of the positive leg of the second axis of said system, a third member embodying a pivot whose axis intersects said first system axis at right angles to the plane of the two axes of said system, said second member being movable along said first system axis and adjustable as to its distance from said third member, and two elements mounted on said pivot and being determinative each of a straight line intersecting said pivot axis, one of said elements being angularly adjustable in the quadrant between the first system axis and the one side of a parallel to said second system axis through said pivot axis, and the second element being angularly adjustable in the quadrant between the first system axis and the other side of said parallel.

5. An instrument for analyzing a business enterprise comprising a first member determinative of the positive leg and the negative leg of the first one of the two axes of a co-ordinate system, a second member determinative of the positive leg of the second axis of said system and including a plurality of lines parallel to said second system axis, a third member embodying a pivot whose axis intersects said first system axis at right angles to the plane of the two axes of said system, and two elements mounted on said pivot and being determinative each of a straight line intersecting said pivot axis, one of said elements being angularly adjustable in the quadrant between the first system axis and the one side of a parallel to said second system axis through said pivot axis, and the second element being angularly adjustable in the quadrant between the first system axis and the other side of said parallel.

6. An instrument for analyzing a business enterprise comprising means determinative of the positive and the negative leg of the first axis, and of the positive leg of the second axis of a co-ordinate system, a member embodying a pivot whose axis intersects said first system axis at right angles to the plane of the two axes of said system, said member being adjustable as to its distance from the said second system axis, at least three elements mounted on said pivot and being determinative each of a straight line radial with respect to said pivot axis, one of said elements being angularly adjustable in the quadrant between the first system axis and the one side of a parallel to said second system axis through said pivot axis, the second element being angularly adjustable in the quadrant between the first system axis and the other side of said parallel, and the third element being angularly movable in both said quadrants.

7. An instrument as claimed in claim 6 further comprising a ruler secured to said member and having an edge parallel to said second system axis and radial with respect to said pivot axis.

8. In an instrument of the type described, a structural triangle including a pivot whose axis constitutes the apex of said triangle, a first shiftable member determinative of a straight line of predetermined length and constituting the base of said triangle, and a second and a third member of variable effective lengths and constituting the sides of said triangle, said second and third members being connected to said pivot so as to be capable of being turned about said pivot axis independently from each other, and being pivotally connected to the ends of said first member, and means for guiding said first member in the direction of said straight line.

9. In an instrument of the type described, the combination of means determinative of an axis of a co-ordinate system, with a first pivot having its axis perpendicular to the plane of said system and intersecting said system axis, two elements rotatably mounted on said first pivot and being determinative each of a straight line radial with respect to said pivot axis, a member spaced from said pivot axis and being shiftable along a line parallel to said system axis, said member including a second and third pivot having their axes spaced a predetermined distance from each other and intersecting said last-mentioned line, said two elements being in shiftable engagement with said second and third pivot respectively so that the lines determined by said elements intersect the respective pivot axes.

10. A device as claimed in claim 9 wherein said first pivot comprises a member having a side face and a substantially flat bottom surface, said side face being provided with a semi-circular recess and said bottom surface having a semi-circular annular groove with an inner diameter larger than that of said recess, the centers of said recess and of said groove coinciding with said pivot axis, and wherein each of said elements is formed by a relatively thin and narrow ruler having one end shaped as a ring sector of substantially three-quarters of a circle, the width and diameters of said sectors corresponding to those of said groove, and each of said elements including a ruling edge extending tongue-like at least as far as the center of said recess, when said elements are inserted with said sectors into said groove of the pivot member.

11. A device as claimed in claim 9 wherein said member and said second and third pivots comprise an elongated body embodying near its ends, bearings with vertical axes, a disc-like piece with a restricted head journaled in each of said bearings, the bottom face of each disc-like face being provided with a groove having parallel flanks one of which being diametrical with respect to the axis of the respective bearing, the width of said groove corresponding to that of one of said elements, and means to prevent said element from dropping out of said groove when in engagement therewith.

12. In an instrument of the type described the combination of a first and a second guiding means parallel to each other, a first member slidable along said first guiding means and including a first pivot, a second member slidable along said second guiding means and including a second and a third pivot, the axes of the three pivots being perpendicular to the plane defined by said parallel guides, and the axes of said third pivot intersecting a line parallel to said second guiding means and being spaced from each other a predetermined distance, and two elements mounted on said first pivot and being determinative each of a straight line radial with respect to the axis of said first pivot, said elements being connected to said second and third pivot respectively so as to be rotatable and shiftable in relation to the respective pivot axes with the lines determined by said elements intersecting said second and third pivot axes respectively.

13. An instrument for analyzing a business enterprise comprising means determinative of the positive and the negative leg of the first axis, and of the positive leg of the second axis of a co-ordinate system, a slide including a pivot having its axis perpendicular to the plane of said system, first means for guiding said slide with said pivot axis along said first system axis, two elements mounted on said pivot and being determinative each of a line radial with respect to the pivot axis, and means in connection with said elements to hold the latter, at a predetermined distance from said first system axis, with the lines determined by said elements angularly spaced a predetermined distance when the angular relation of said elements to said first system axis is varied owing to a shift of said slide or a turning of said elements about said pivot.

14. An instrument for analyzing a business enterprise comprising means determinative of the positive and the negative leg of the first axis, and of the positive leg of the second axis of a co-ordinate system, a slide including a pivot having its axis perpendicular to the plane of said system, first means for guiding said slide with said pivot axis along said first system axis, two elements mounted on said pivot and being determinative each of a line radial with respect to the pivot axis, second guiding means parallel to said first system axis and spaced therefrom a predetermined distance, a second slide movable along said second guiding means and including a second and a third pivot spaced from each other a predetermined distance and having axes perpendicularly intersecting a line parallel to the first system axis, said elements being connected to said second and third pivots respectively for rotation and being lengthwise shiftable thereto, a percentage scale on said second slide and having its two end marks coinciding with the axes of said second and said third pivot respectively, and a third element rotatably mounted on said first pivot and being determinative of a straight line radial with respect to the axis of said first pivot whereby said line determined by said third element is useful as an indicator in relation to said percentage scale.

15. An instrument as claimed in claim 14 further comprising a ruler parallel to said second system axis and shiftable along said first system axis, said ruler including a percentage scale having its end marks respectively coinciding with said first system axis and with the connecting line of said second and third pivot.

16. An instrument for analyzing a business enterprise comprising means determinative of the positive and the negative leg of the first axis, and of the positive leg of the second axis of a co-ordinate system, a slide including a pivot having its axis perpendicular to the plane of said system, first means for guiding said slide with said pivot axis along said first system axis, two elements mounted on said pivot and being determinative each of a line radial with respect to the pivot axis, second guiding means parallel to said first system axis and spaced therefrom a predetermined distance, a second slide movable along said second guiding means and including a second and a third pivot spaced from each other a predetermined distance and having axes perpendicularly intersecting a line parallel to the first system axis, said elements being connected to said second and third pivots respectively for rotation and being lengthwise shiftable thereto, a percentage scale on said second slide and having its two end marks coinciding with the axes of said second and said third pivot respectively, and a third element rigidly connected to said first slide and being determinative of a straight line parallel to said second axis and radial with respect to the axis of said first pivot whereby said line determined by said third element is useful as an indicator in relation to said percentage scale.

17. An instrument for analyzing a business enterprise, comprising means determinative of the position and the negative leg of the first axis, and of the positive leg of the second axis of a co-ordinate system, a slide including a pivot having its axis perpendicular to the plane of said system, first means for guiding said slide with said pivot axis along said first system, a first, a second, and a plurality of third elements mounted on said pivot and being determinative each of a straight line radial with respect to the pivot axis, second guiding means parallel to said first system axis and spaced therefrom a predetermined distance, a second slide movable along said second guiding means and including a second and a third pivot spaced from each other a predetermined distance and having axes perpendicularly intersecting a line parallel to the first system axis, said first and said second element being connected to said second and third pivots respectively for rotation and being lengthwise shiftable thereto, a percentage scale on said second slide and having its two end marks coinciding with the axes of said second and said third pivot respectively, whereby the line determined by at least one of said third elements is useful as an indicator in relation to said percentage scale.

18. An instrument comprising a base board, a frame hinged to said board, means in connection with said board and determinative of at least one of the axes of a co-ordinate system, with the said frame including a first guiding member parallel to said axis and a second guiding means parallel to and spaced from said first guiding means, a first slide shiftable along said first guiding means and including means determinative of a first variable point on said system axis, a second slide shiftable along said second guiding means and including means determinative of a second and a third variable point, said second and said third point being spaced from each other a predetermined distance and being located on a line parallel to said system axis, a first and a second element connected to said first and to said second slide, said first element being indicative of a straight line between said first and said second point, and said second element being indicative of a straight line between said first and said third point, and a third element in connection with the first slide for indicating the height of the triangle whose apex is constituted by said first point and whose base is constituted by the line connecting said second and third point.

19. An instrument for analyzing a business enterprise comprising means determinative of the positive and the negative leg of the first axis and of the positive leg of the second axis of a co-ordinate system, scales in connection with said axes respectively, a structural triangle variable as to its angles and as to its position relatively to said axes, said triangle including a member determinative of the triangle apex and being shiftable along said first system axis, and a member determinative of the triangle base having a predetermined length, and being parallel to said first system axis and lengthwise shiftable, and means for maintaining a predetermined spacing of said apex from said base, the ratio of the increment of the scale of said first axis over the increment of the scale of the second axis being equal to the ratio of the length of said triangle base over the distance of said apex from said base.

20. An instrument as claimed in claim 19 wherein the increments of said scales are equal to each other and the lengths of the base and of the height of the triangle are also equal.

HERBERT WALLER.
ALFRED F. SCHLOMANN.